United States Patent [19]

Olson et al.

[11] Patent Number: 5,277,390
[45] Date of Patent: Jan. 11, 1994

[54] APPARATUS FOR MOUNTING LOAD SUPPORTING EQUIPMENT ON A FIXED SUPPORT

[75] Inventors: Wayne L. Olson, Central Point, Oreg.; Gary E. Choate, Lakewood, Colo.

[73] Assignee: Rose Systems, Inc., Englewood, Colo.

[21] Appl. No.: 944,894

[22] Filed: Sep. 15, 1992

[51] Int. Cl.$^5$ ............................................. F16L 3/08
[52] U.S. Cl. ................................. 248/218.4; 248/231
[58] Field of Search ............... 248/218.4, 219.1, 219.4, 248/230, 231; 414/23

[56] References Cited

U.S. PATENT DOCUMENTS

| | | | |
|---|---|---|---|
| 4,239,188 | 12/1980 | Hobbs | 248/637 X |
| 5,117,779 | 6/1992 | Karow | 248/231 X |
| 5,172,881 | 12/1992 | Stein | 248/218.4 X |

FOREIGN PATENT DOCUMENTS 0034312 4/1929 France ......................... 248/218.4

Primary Examiner—Ramon O. Ramirez
Attorney, Agent, or Firm—Joseph J. Kelly

[57] ABSTRACT

Apparatus for mounting load supporting equipment, such as a D-ring, on a fixed vertical or horizontal support wherein a movement preventing device is used to hold an elongated strap of material in position on the fixed support by preventing relative movement between superposed end portions of the elongated strap and wherein, in one embodiment, a support member for supporting the load supporting equipment is secured to the movement preventing device and in another embodiment a support bracket for supporting the load supporting equipment is held in a location against a portion of the fixed vertical or horizontal support.

17 Claims, 1 Drawing Sheet

APPARATUS FOR MOUNTING LOAD SUPPORTING EQUIPMENT ON A FIXED SUPPORT

FIELD OF THE INVENTION

This invention relates generally to apparatus for use in supporting loads and more particularly to apparatus for mounting load supporting equipment, such as a D-ring, on a fixed vertical or horizontal support.

BACKGROUND OF THE INVENTION

In today's world, it is necessary to provide a load supporting device either for the moving of material or apparatus onto or from a job site or for providing a mounting for safety equipment used by personnel working at the job site. One use of the apparatus is in relation to vertically extending utility poles which ar generally formed from wood and have gradually tapering outer surfaces with the greatest diameter thereof being at the lowermost portion thereof. Apparatus presently in use comprises an L-shaped hook held onto the utility pole by a chain and a screw-type tensioning device. It has been known that such devices are not reliable and reported cases have described where a device has slipped and the workers wind up with a stomach full of wooden splinters. In lifting steel beams into position to be attached to other steel beams, it has been customary to weld lifting hooks to the beams, but this is not desirable because of the expense and subsequent requirement for their removal. Also, there are may instances wherein the nature of the material in the object cannot be welded thereto, such as in glass fiber reinforced plastic tanks of relatively large diameters. Thus, there exists a need for apparatus for mounting load supporting equipment in a variety of locations on a variety of different sized objects.

BRIEF DESCRIPTION OF THE INVENTION

This invention provides apparatus for mounting load supporting equipment, such as a D-ring, on a fixed vertical or horizontal support using a banding strap for holding the load supporting equipment at a desired position wherein movement preventing means are provided for preventing relative movement between superposed ends of the banding strap.

In one preferred embodiment of the invention, an integral base member is provided and has an outer portion, at least a pair of opposite side walls and an inner portion opposite to and spaced from at least portions of the outer portion so as to form a passageway therebetween. The base member preferably is continuous, but the inner portion may comprise segments having spaced apart end edges. An elongated strap is mounted so that a first end portion thereof passes through the passageway and is connected to the inner portion. A central body portion of the elongated strap is then passed around the fixed support and a second end portion thereof is then passed through the passageway in a direction opposite to the first end portion so that the first and second end portions are in a superposed relationship. Movement prevent means are provided for preventing relative movement between the first and second end portions. In a preferred embodiment of the invention, the outer portion of the base member is provided with a plurality of spaced apart threaded openings extending therethrough and the inner portion is provided with a plurality of spaced apart recesses, preferably openings extending therethrough, in alignment with the plurality of spaced apart threaded openings. A headed threaded bolt is in threaded engagement in each of the plurality of space apart threaded openings and has a tapered end portion so that when the headed threaded bolt is tightened to a predetermined torque, the tapered end portion will push portions of the superposed first and second end portions into one of the aligned recesses to prevent relative movement between the first and second end portions.

In one preferred embodiment of the invention, the mounting means comprise a support member for supporting the load supporting equipment. The support member comprises a plate member having opposite side portions lying substantially in a common plane and adapted to contact the outer portion of the base member. Each of the opposite side portions has at least one opening extending therethrough. The plate member has an integral middle portion spaced from the surfaces of the opposite side portions to form an opening between the middle portion and the outer portion. At least a portion of the load supporting equipment is located in the opening. The plate member is secured to the outer portion by passing each of the headed threaded bolts through the at least one opening in the opposite side portions prior to being threaded into one of the plurality of spaced apart threaded openings.

In another preferred embodiment of the invention, the mounting means comprise a support bracket having a central body portion and end portions adapted to contact the fixed support so that the central body portion is spaced from the fixed support to form an opening so that at least a portion of the load supporting equipment may be located therein. The support bracket preferably has a generally triangularly shaped cross-sectional configuration. The support bracket is secured to a fixed support using a movement preventing means similar to the type described above. The first end portion of an elongated strap is moved through the passageway and secured to the inner portion. A portion of the load supporting equipment is passed through the end portions of the support bracket which end portions are then held against a portion of the fixed support 80. The central body portion is then passed around the fixed support and the support bracket and the second end portion is passed through the passageway so that the first and second end portions are in superimposed relationship. A conventional strapping tool is then attached to the second end portion to draw the elongated strap into a tightened condition around the fixed support and the outer surface of the support bracket. The plurality of headed threaded bolts are then tightened as described above to prevent relative movement between the first and second end portions. If desired, the outer surface of the support bracket may be provided with outwardly extending opposite flange portions so that a portion of the elongated strap ma be located therebetween to prevent relative linear movement between the support bracket and the elongated strap.

BRIEF DESCRIPTION OF THE DRAWINGS

Illustrative and presently preferred embodiments of the invention are shown in the accompanying drawings in which.

DETAILED DESCRIPTION OF THE INVENTION

Figure 1:
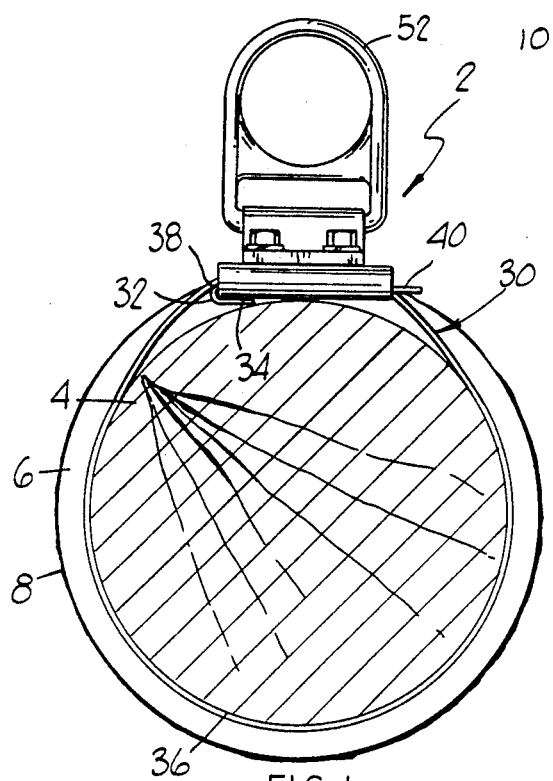
FIG. 1 is a top plan view with parts in section of a preferred embodiment of the apparatus of the invention installed on the upper portion of a wooden utility pole.
Figure 2:
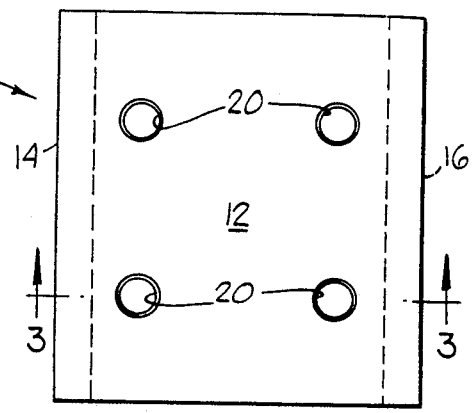
FIG. 2 is a top plan view of the base member of the movement preventing means of this invention.
Figure 3:
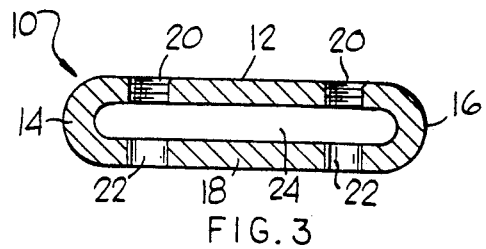
FIG. 3 is a cross-sectional view taken on the line 3—3 of FIG. 2.

In FIG. 1, there is illustrated one preferred embodiment of apparatus 2 mounted on a wooden utility pole 4 having a tapered outer surface 6 with the lowermost portion 8 thereof having the largest diameter. Although a wooden utility pole 4 is illustrated, the apparatus 2 has use with utility poles formed from other materials, such as aluminum. The apparatus 2 includes a base member 10, FIGS. 2 and 3, comprising an outer portion 12, integral arcuate opposite side portions 14 and 16 and an inner portion 18 integral with the opposite side portions 14 and 16. If desired, the inner portion can comprise opposite side sections having spaced apart terminal end portions. The outer portion 1 is provided with a plurality of spaced apart threaded openings 20 extending therethrough. The inner portion 18 is provided with a plurality of recesses in alignment with the threaded openings 20 and preferably each of the recesses comprises an opening 22 extending therethrough. The outer portion 12 is spaced from the inner portion 18 to provide a passageway 24 extending through the base member 10.

The base member 10 is secured to the wooden utility pole 4 using an elongated strap 30. The elongated strap 30 has a first end portion 32 that passes through the passageway 24 and has an outer portion 34 thereof folded back over the inner portion 18 to anchor the first end portion 32 to the inner portion 18. A central body portion 36 of the elongated strap 30 extends around the tapered outer surface 6 and an integral second end portion 38 is passed through the passageway 24 so that a free outer end portion 40 extends outwardly from the base member 10. The free outer end portion 40 is adapted to be secured to a conventional strapping tool (not shown) so that a force may be applied thereto to draw the central body portion 36 and the base member 10 into a tight relationship with the tapered outer surface 6.

Figure 4:
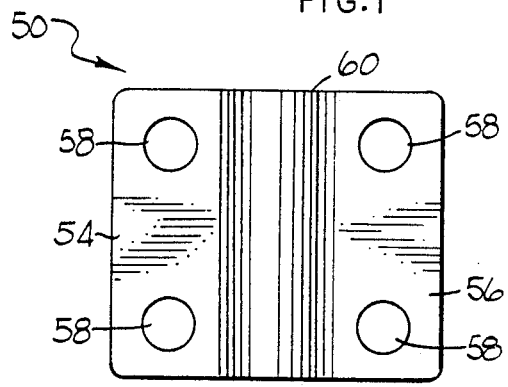
FIG. 4 is a top plan view of a support member of this invention.
Figure 5:
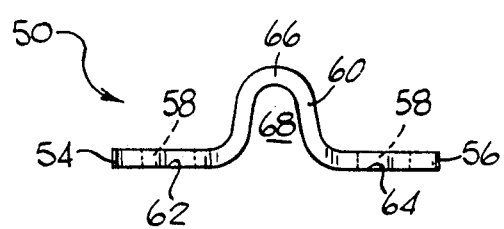
FIG. 5 is an end elevational view taken from the bottom of FIG. 4.

In FIGS. 4 and 5, there is illustrated a support member 50 for supporting load supporting equipment 52, such as a D-ring. The support member 50 has two opposite side portions 54 and 56, each having a plurality of spaced apart openings 58 formed therein, and an integral middle portion 60. The opposite side portions 54 and 56 have surfaces 62 and 64 adapted to contact the outer portion 12. The integral middle portion 60 has a section 66 that is spaced from the surfaces 62 and 64 to form an opening 68 in which a portion of the load supporting equipment 52 is located.

Figure 6:
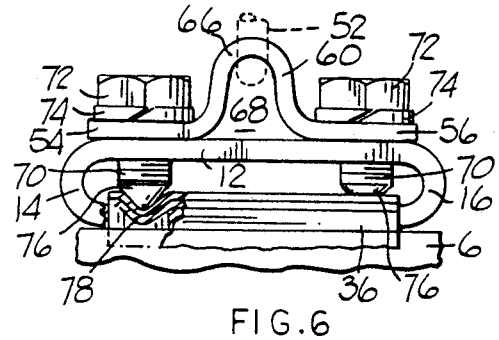
FIG. 6 is an end elevational view with parts in sections of an assembled apparatus of this invention.

After the strapping tool, described above, has pulled the elongated strap 30 against the tapered surface 6, the support member 50 is placed over the outer portion 12 with the openings 58 in alignment with the threaded openings 20. A threaded bolt 70 having an enlarged head portion 72 and a split lock washer 74 is threaded into each of the threaded openings 20. The bolt 70 has a tapered end portion 76 adapted to contact the second end portion 38. As illustrated in FIG. 6, as the bolt 70 is tightened, the tapered end portion 76 pushes portions 78 of the first and the second end portions 32 and 38 into each opening 22 to prevent relative movement between the first and the second end portions 32 and 38. The combination of no relative movement between the first and second end portions 32 and 38 and the tapered outer surface 6 prevents downward movement of the elongated strap 30 and the load supporting equipment 52.

In one preferred embodiment of the invention, the base member 10 was formed from a stainless steel tube having a diameter of about 2.50 inches and a wall thickness of about 0.125 inch which was deformed to form a passageway 24 of about 0.25 inch. Four bolts 70 having a diameter of about 0.375 inch were tightened to a predetermined torque, for example, 25 ft. lbs. There was no relative movement between the first and second end portions 32 and 38 when subjected to a force of 6000 pounds.

Figure 7:
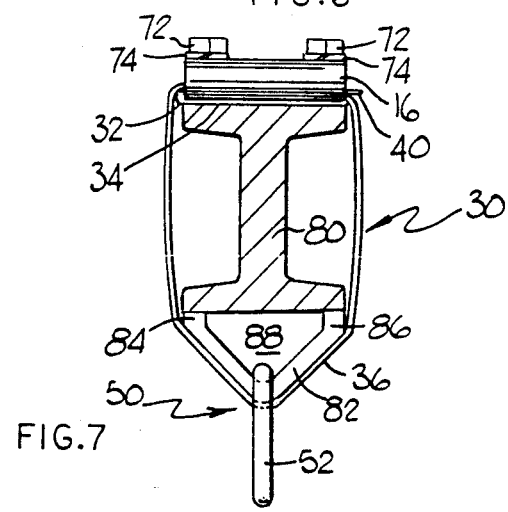
FIG. 7 is an elevational view with parts in section of another preferred embodiment of the invention installed on an I-beam.

Another preferred embodiment of the invention is illustrated in FIG. 7 which shows a load supporting equipment 52 secured to an I-beam 80. The support member 50 comprises a strip of material 82 having a generally triangularly shaped cross-sectional configuration having a pair of opposite end portions 84 and 86 having surfaces adapted to contact the I-beam 80. When attached to the I-beam 80, as illustrated in FIG. 7, the strip of material 82 forms an opening 88 in which a portion of the load supporting equipment 52 is located. If desired, the opposite end portions 84 and 86 may be integrally connected by a strip of material extending therebetween.

The apparatus illustrated in FIG. 7 is assembled by affixing the first end portion 32 to the inner portion 18, a described above. A portion of the load supporting equipment 52 is positioned in the opening 88 and the central body portion 36 is passed around the outer surface of the strip of material 82. The second end portion 38 is then passed through the passageway 24 and the outer end portion 40 is engaged by a strapping tool (not shown). After the proper tension has been placed on the elongated strap 30, bolts 70 are tightened as described above to prevent relative movement between the first and the second end portions 32 and 38. If desired, opposite outwardly projecting end flanges (not shown) can be formed on the outer surface of the strip of material 82 to confine a portion of the central body portion 36 therebetween.

While illustrative and presently preferred embodiments of the invention have been described in detail herein, it is to be understood that the inventive concepts ma be otherwise variously embodied and employed and that the appended claims are intended to be construed to include such variations except insofar as limited by the prior art.

What is claimed is:

1. Apparatus for mounting load supporting equipment at a desired location on a fixed vertical or horizontal support comprising:
   an integral base member having an outer portion, at least a pair of opposite sidewalls and an inner portion opposite to and spaced from at least portions of the outer portion to form a passageway therebetween;

an elongated strap having a first end portion thereof passing through said passageway in one direction and a second end portion thereof passing through said passageway in an opposite direction so that at least portions of said first and second end portions are in a superposed relationship;

said elongated strap having a central body portion passing around said fixed support;

mounting means for cooperating with said integral base member and said elongated strap for mounting load supporting equipment at a relatively fixed location relative to said fixed support; and movement preventing means for preventing relative movement between said at least portions of said first and second end portions.

2. Apparatus as in claim 1 wherein:
said fixed support is located between said central body portion and said inner portion.

3. Apparatus as in claim 2 wherein said mounting means comprises:
a support member;
securing means for securing said support member to said integral base member; and
retaining means for retaining said load supporting equipment between said support member and said integral base member.

4. Apparatus as in claim 1 wherein said mounting means comprises:
a support bracket having at least a portion of said load supporting equipment located thereon; and
retaining means for retaining said support bracket on said fixed support.

5. Apparatus as in claim 1 wherein said movement preventing means comprises:
said outer portion having a plurality of spaced apart threaded openings extending therethrough;
said inner portion having at least a plurality of recesses formed therein and located in alignment with said plurality of threaded openings;
a plurality of headed threaded bolts in threaded engagement with said plurality of threaded openings and each having an end portion for contacting one of said superposed first and second end portions of said elongated straps; and
each of said headed threaded bolts being tightened a sufficient amount so that said end portion of said headed threaded bolt moves portions of said superposed first and second end portions into said recesses.

6. Apparatus as in claim 5 wherein said mounting means comprises:
a support member;
securing means for securing said support member to said integral base member; and
retaining means for retaining said load supporting equipment between said support member and said integral base member.

7. Apparatus as in claim 6 and further comprising:
said support member having a plurality of spaced apart openings extending therethrough; and
each of said plurality of headed threaded bolts passing through one of said plurality of spaced apart openings prior to being in threaded engagement with said plurality of spaced apart threaded openings.

8. Apparatus as in claim 7 wherein said support member comprises:

a plate member having opposite side portions having surfaces lying substantially in a common plane and adapted to be placed into contact with said outer portion;
said opposite side portions having said plurality of spaced apart openings formed therein;
said plate member having an integral middle portion spaced from said surfaces of said opposite side portions to form an opening between said middle portion and said outer portion; and
at least a portion of said load supporting equipment being located in said opening.

9. Apparatus as in claim 8 wherein said load supporting equipment comprises:
a D-ring.

10. Apparatus as in claim 1 and further comprising:
anchoring means for anchoring at least a portion of said first end portion to a portion of said inner portion.

11. Apparatus for mounting load supporting equipment at a desired location on a fixed vertical or horizontal support comprising:
an integral base member having an outer portion, at least a pair of opposite sidewalls and an inner portion opposite to and spaced from at least portions of the outer portion to form a passageway therebetween;
an elongated strap having a first end portion thereof passing through said passageway in one direction and a second end portion thereof passing through said passageway in an opposite direction so that said first and second end portions are in a superposed relationship;
said elongated strap having a central body portion passing around said fixed support;
mounting means for cooperating with said integral base member and said elongated strap for mounting load supporting equipment at a relatively fixed location relative to said fixed support;
movement preventing means for preventing relative movement between said first and second end portions;
said fixed support is located between said central body portion and said inner portion;
and wherein said mounting means comprises:
a support member;
securing means for securing said support member to said integral base member; and
retaining means for retaining said load supporting equipment between said support member and said integral base member;
and wherein said movement preventing means comprise:
and wherein said movement preventing means comprise:
said outer portion having a plurality of spaced apart threaded openings extending therethrough;
said inner portion having at least a plurality of recesses formed therein and located in alignment with said plurality of threaded openings;
said support member having a plurality of spaced apart openings extending therethrough; and
said securing means comprises a plurality of headed threaded bolts passing through said plurality of spaced apart openings and in threaded engagement with said plurality of spaced apart threaded openings and tightened to move portions of said superpose first and second end portions into said recesses.

12. Apparatus as in claim 11 wherein said support member comprises:
   a plate member having opposite side portions having surfaces lying substantially in a common plane and adapted to be placed into contact with said outer portion;
   said opposite side portions having said plurality of spaced apart openings formed therein;
   said plate member having an integral middle portion spaced from said surfaces of said opposite side portions to form an opening between said middle portion and said outer portion; and
   at least a portion of said load supporting equipment being located in said opening.

13. Apparatus as in claim 12 wherein said load supporting equipment comprises:
   a D-ring.

14. Apparatus for mounting load supporting equipment at a desired location on a fixed vertical or horizontal support comprising:
   an integral base member having an outer portion, at least a pair of opposite sidewalls and an inner portion opposite to and spaced from at least portions of the outer portion to form a passageway therebetween;
   an elongated strap having a first end portion thereof passing through said passageway in one direction and a second end portion thereof passing through said passageway in an opposite direction so that said first and second end portions are in a superposed relationship;
   said elongated strap having a central body portion passing around said fixed support;
   mounting means for cooperating with said integral base member and said elongated strap for mounting load supporting equipment at a relatively fixed location relative to said fixed support;
   movement preventing means for preventing relative movement between said first and second end portions;
   and wherein said mounting means comprises:
   a support bracket having at least a portion of said load supporting equipment located thereon; and
   retaining means for retaining said support bracket on said fixed support;
   and wherein said support bracket comprises:
   a strip of material having a central section and integral first and second end portions spaced a distance apart to permit said at least a portion of said load supporting equipment to pass therethrough and be supported by said central section.

15. Apparatus as in claim 14 wherein:
   said strip of material has a substantially triangular cross-sectional configuration.

16. Apparatus as in claim 14 wherein said retaining means comprises:
   a portion of said central body portion in contact with said central section and holding said first and second end portions in a contacting relationship with a portion of said fixed support.

17. Apparatus as in claim 16 wherein said movement preventing means comprises:
   said outer portion having a plurality of spaced apart threaded openings extending therethrough;
   said inner portion having at least a plurality of recesses formed therein and located in alignment with said plurality of threaded openings;
   a plurality of headed threaded bolts in threaded engagement with said plurality of threaded openings and each having an end portion for contacting one of said superposed first and second end portions of said elongated strap; and
   each of said headed threaded bolts being tightened a sufficient amount so that said end portion of said headed threaded bolt moves portions of said superposed first and second end portions into said recesses.

* * * * *